United States Patent

Box

[11] 3,754,676
[45] Aug. 28, 1973

[54] POULTRY TRANSPORT CAGE
[76] Inventor: Theodor Box, 1108 Aileen Rd., Brielle, N.J. 08730
[22] Filed: July 14, 1971
[21] Appl. No.: 162,536

[52] U.S. Cl. .................. 220/31 S, 119/19, 217/36, 220/4 E
[51] Int. Cl. ........................ B65d 43/16, B65d 1/38
[58] Field of Search .............. 220/31 R, 31 S, 97 R, 220/4 E; 217/36, 57; 119/19

[56] References Cited
UNITED STATES PATENTS

| 3,330,434 | 7/1967 | Bromley | 220/31 S |
| 3,246,792 | 4/1966 | Brackmann | 220/31 S |
| 2,765,094 | 10/1956 | Ryan | 220/31 S |
| 3,217,919 | 11/1965 | Long | 220/97 R |
| 3,095,992 | 7/1963 | Shreckhise | 119/19 |

Primary Examiner—George E. Lowrance
Attorney—Kenyon & Kenyon Reilly Carr & Chapin

[57] ABSTRACT

A poultry transport cage of the type having a rectangular frame structure supporting openwork sides, ends, bottom, and top with additional longitudinal and lateral enlarged beam members spaced from the sides and ends of the cage for reinforcing the top has an enlarged opening in the top for convenient insertion and withdrawal of poultry into and from the cage.

Flanges across the corners of the opening support a complementary hinged lid without restricting the lateral and longitudinal dimensions of the opening and at the same time round the corners of the opening to reduce injury to poultry being inserted into or withdrawn from the cage.

7 Claims, 5 Drawing Figures

Patented Aug. 28, 1973
3,754,676
2 Sheets-Sheet 1
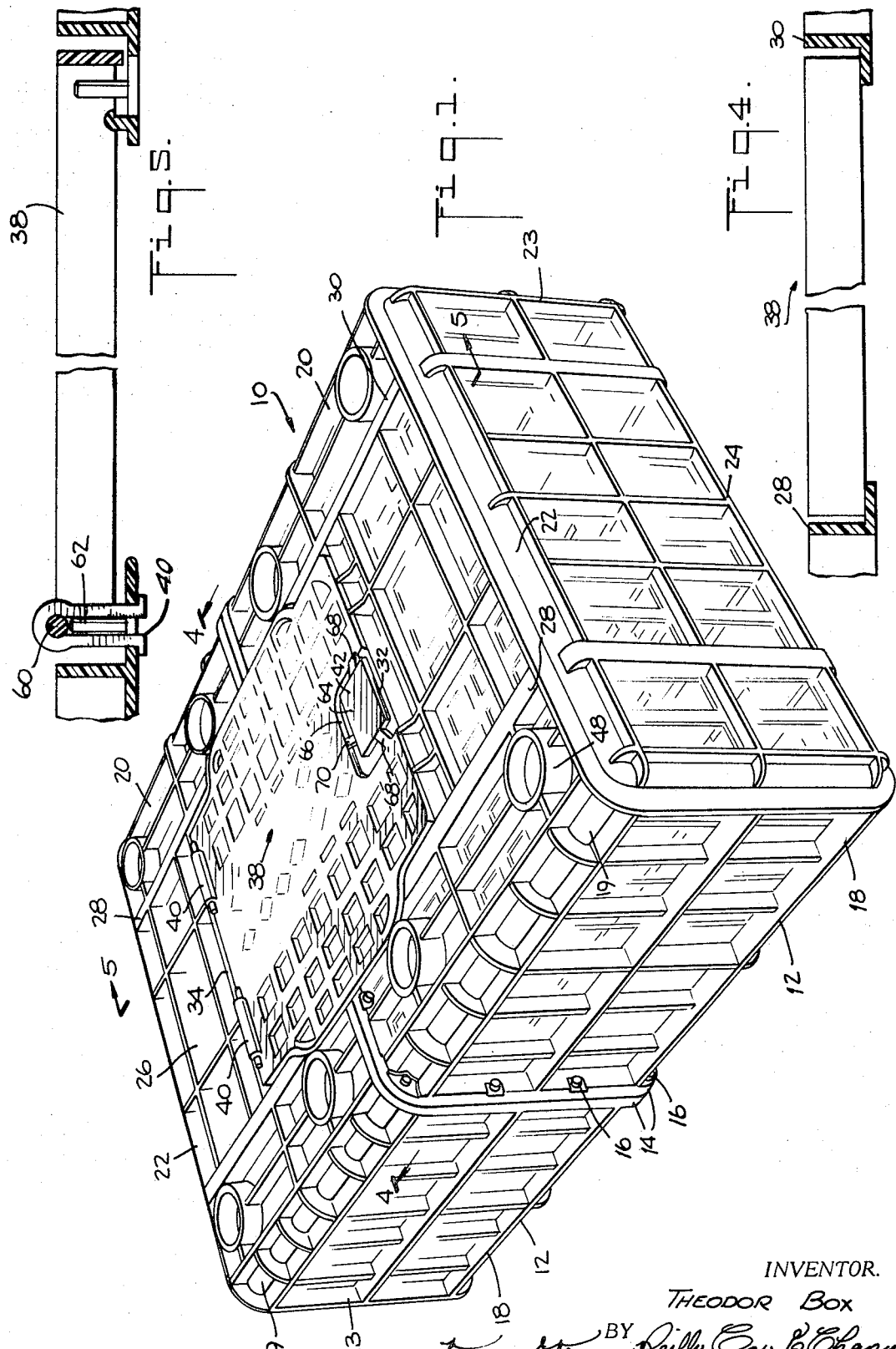
INVENTOR.
THEODOR BOX
BY
Kenyon & Kenyon Reilly, Carr & Chapin
ATTORNEYS Patented Aug. 28, 1973

INVENTOR.
THEODOR BOX
BY
Kenyon & Kenyon Reilly Carr & Chapin
ATTORNEYS 3,754,676

POULTRY TRANSPORT CAGE

BACKGROUND OF THE INVENTION

This invention relates to animal cages and, more particularly, to poultry transport cages of the stacking type used for making truckload shipments of live poultry.

For convenience in handling and to minimize injury, poultry is usually shipped in rectangular cages each holding six chickens. These cages are conventionally of wire or wooden latticework construction throughout with a heavy wood rectangular frame strong enough to bear the weight of other cages stacked to heights of six to eight feet. The cage tops normally have an additional pair of longitudinal beam members extending parallel to the sides to provide walking support for the loaders as they stack the cages on board a truck, for example. The longitudinal beam members may be joined by lateral beam members to form a supporting grid structure for the top.

The longitudinal and lateral beams define a central rectangular access opening, normally closed by a hinged lid. The maximum lateral size of this opening is dictated by the spacing of the longitudinal beam members and the longitudinal size by the spacing of the lateral beam members. These spacings, in turn, are limited by the need to provide distributed support for a man standing on the top of the cage. In conventional cages, the size of the access opening is further limited by flanges extending from the bottoms of and parallel to the longitudinal and lateral beam members to provide support for the hinged lid in its closed position.

The size and shape of the access opening is important because, in placing chickens inside a cage, the usual method is to grasp six chickens each by a leg and thrust them simultaneously through the opening. With the usual rectangular opening the effect is somewhat like trying to force a round peg into a square hole. In the process, chickens often are bruised or even more seriously injured.

Recently, cages have begun to be made completely of molded plastic instead of wood, but the constraints imposed by the need to conform to the exterior dimensions of the other cages and to support a standing man dictate a supporting gridwork structure for the top substantially similar to that used for the older wooden cages. The problem, regardless of material of construction, is how to provide an access opening that corresponds more nearly to the shape and dimensions of a clutch of chickens without decreasing the strength or changing the spacing of the longitudinal and lateral beam members and, at the same time, provide support for the hinged lid when it is closed.

SUMMARY OF THE INVENTION

An object of the present invention is to provide a poultry transport cage having an enlarged, rounded access opening, for easier and faster loading and unloading with reduced likelihood of injury to the poultry, that meets the size, weight and strength requirements for cages in the contemplated service.

In the poultry transport cage of the present invention, enlarged longitudinal beam members in combination with lateral cross-beam members define, respectively, the lateral and longitudinal boundaries of an access opening in the top. Each longitudinal beam member is offset outwardly for at least a portion of the access opening to provide a widened and approximately rounded opening. A complementary lid hinged to one of the beam members fits within the access opening so that its top surface is substantially flush with the top of the cage structure. Lid-supporting flanges extend at an angle across each corner of the opening to further round the access opening without substantially reducing the usable area of the opening.

A preferred embodiment of the invention comprises two identical cage halves of molded plastic joined together by metal or plastic fasteners to form a complete cage. Spaced longitudinal channel beam members along the top define the lateral boundaries of the access opening. To obtain an opening of greater lateral dimension, the U-shaped cross-section of the longitudinal beam members is changed in the central portion of the opening to an offset L-shaped cross-section of approximately equal bending strength. The lid member is formed with lateral wing portions extending into recesses resulting from the change in cross-section of the beam members.

THE DRAWINGS

FIG. 1 is a top perspective view of the completely assembled preferred embodiment of the invention.

FIG. 4 is a transverse cross-sectional view of the access opening region of the preferred embodiment taken along line 4—4 of FIG. 1.

FIG. 5 is a longitudinal cross-sectional view of the access opening region of the preferred embodiment taken along line 5—5 of FIG. 1.

DESCRIPTION OF THE PREFERRED EMBODIMENT

Figure 2:
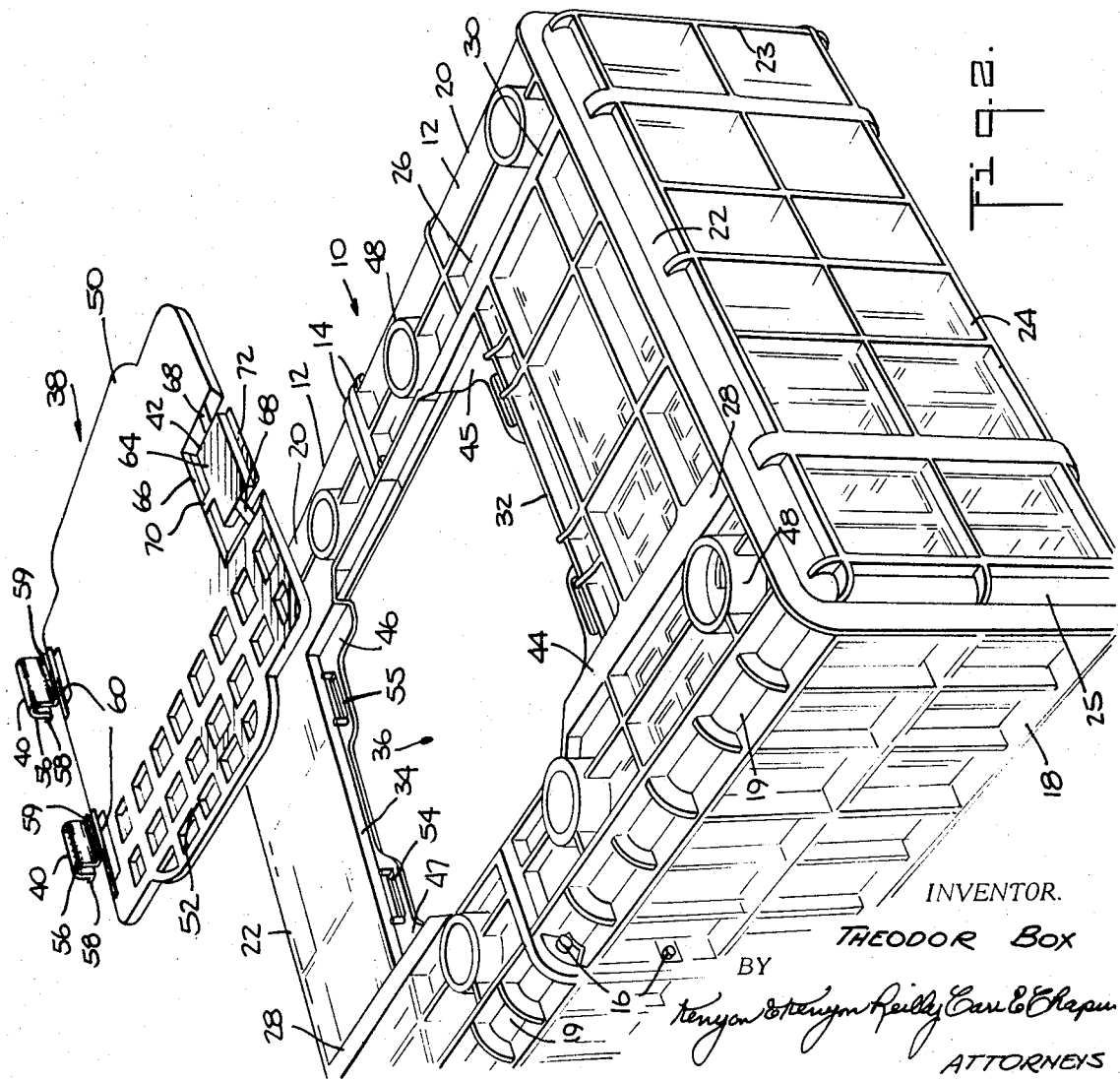
FIG. 2 is a top perspective view of the embodiment of FIG. 1 with the hinged lid to the access opening removed.

Referring to FIGS. 1 and 2, the invention comprises an improved poultry transport cage 10, preferably of molded plastic construction. The cage is assembled of two identical molded halves 12 joined together at their flanged bases 14 by steel bolts 16 or plastic rivets (not shown). Each molded half includes a rectangular frame comprising enlarged longitudinal side frame beam members 18, 19, 20 and 21 and enlarged end frame beam members 22, 23, 24 and 25. The sides, ends, bottom and top of the cage are of overall openwork construction with alternate heavy and light sections to provide maximum strength with minimum weight. The top 26 of cage 10 includes an additional pair of enlarged longitudinal beam members 28 and 30 joined by lateral beam members 32 and 34 to define an access opening 36. A lid member 38 pivotally mounted to transverse beam member 34 by plastic hinges 40 fits within access opening 36. Lid member 38 is held in the shut position by integrally molded latch member 42.

Lid-supporting flanges 44, 45, 46 and 47 extend across each corner of access opening 36 at a depth such that the lid is supported when shut with its top surface flush with the top surface of the cage. Between each longitudinal beam member 28 and 30 and its respective adjacent side frame member 18 and 19 is a row of molded cylindrical members 48 adapted to fit within complementary socket members (not shown) extending below the surface of the bottom of another cage for locking engagement when the cages are stacked one on another.

To increase the effective area of access opening 36, longitudinal beam members 28 and 30 are offset outwardly for a portion of the opening by means of a change from an inverted U-shaped cross-section near the ends of the cage to an L-shaped cross-section adjacent the opening, as shown in FIG. 4. The vertical leg of the L-shaped cross-section is slightly displaced laterally outward from the line of the outermost vertical leg of the U-shaped cross section. Lid member 38 is formed with lateral wing portions 50 and 52 to correspond with the wider access opening created by this change in longitudinal beam member cross-section.

Figure 3:
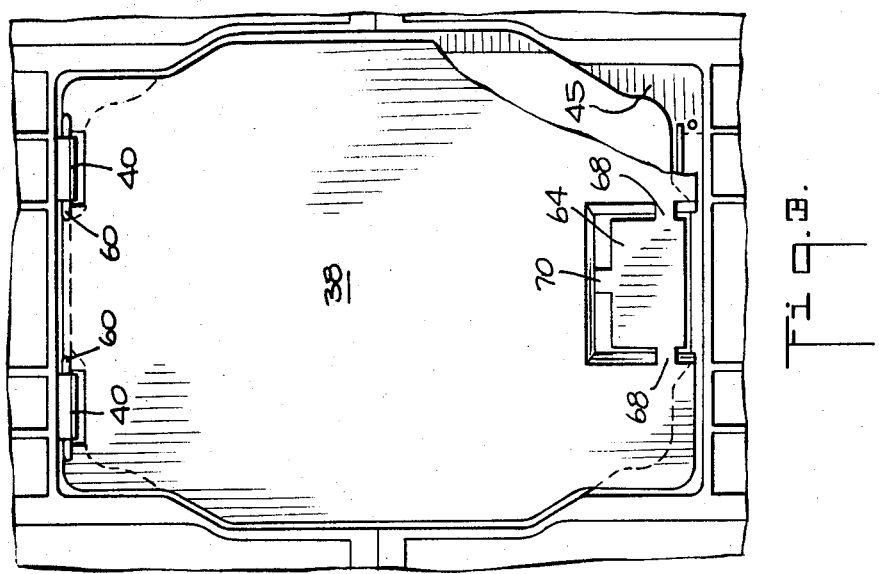
FIG. 3 is a partially cut away view of the region including the access opening of the invention with hinged lid in place.

As indicated clearly in FIGS. 2 and 3, the end result is a substantially rounded access opening having maximum lateral and longitudinal dimensions. The area of the opening is at least one-half of the area between the longitudinal beam members and at least one-third of the total area of the top of the cage. This enlarged opening is obtained without sacrificing the bending strength of longitudinal beam members 28 and 30. The general requirements for both overall strength and distributed top surface load-carrying ability are thereby maintained.

A feature of the preferred embodiment illustrated in the drawings is that all working parts of the cage are of molded plastic construction. Another feature is that the cage comprises a minimum number of separate parts. For example, hinges 40 secure lid member 38 through slots 54 and 55 in flanges 46 and 47 respectively without the need for screws. This is accomplished by making each hinge 40 in the form of an inverted U-shaped portion 56 having outwardly-extending flanges 58 and 59. Each hinge 40 slips over a hinge pin 60 integrally molded into lid member 38. The lid member 38 is then set in place so that hinge pins 60 lie on vertical spacer pins 62, integrally molded on flanges 46 and 47 at each end of slots 54 and 55. Flanges 58 and 59 are then compressed together and snapped through slots 54 and 55 to hold the lid member 38 firmly to flanges 46 and 47, as shown in FIG. 5.

As mentioned above, latch member 42 is integrally molded into lid member 38. Latch member 42 comprises a rectangular portion 64 joined on three sides to corresponding edges of a rectangular cut-out portion 66 in lid member 38. At each end, the rectangular portion 64 is joined to the lid by plastic torsional hinge tabs 68. At one side the rectangular portion 64 is joined to the lid by a S-shaped plastic spring member 70 for permitting limited rotation about the axis of the torsional hinge tabs 68. A beveled lip 72 on the other side of the latch catches under the bottom of lateral beam member 32 for locking engagement therewith. The beveled lip 72 can be released by pulling upward on the opposite side of rectangular portion 64 against the biasing force of the S-shaped spring 70.

From the above description, it is apparent that the poultry transport cage of the invention provides an enlarged access opening with rounded corners without departing from the basic constraints imposed by overall dimensions, strength and weight requirements for such a device.

I claim:

1. A poultry transport cage of the type having a strong rectangular frame supporting openwork sides, ends, bottom and top wherein the top of the cage comprises:
   a pair of longitudinal beam members spaced from and parallel to the sides of the cage;
   a pair of lateral beam members spaced from and parallel to the ends of the cage between the longitudinal beam members, the space between the longitudinal and lateral beam members defining an access opening into the cage;
   a lid fitting within the access opening;
   hinge means for connecting the lid to one edge of the access opening to permit rotating the lid between open and shut positions; and
   flanges extending across the corners of the access opening at the intersections of the longitudinal and lateral beam members for supporting the lid flush with the top when the lid is shut, the flanges also serving to round the corners of the access opening without decreasing the length and width dimensions of the opening for easier insertion and removal of poultry when the lid is open.

2. The poultry cage of claim 1 wherein the longitudinal beam members each comprise:
   end portions extending outwardly to the ends of the cage from the intersection of the corresponding corner flange with the beam, said end portions having a channel-shaped cross section in the form of an inverted U for combining light weight with substantial vertical and lateral bending stiffness and
   a center portion between the end portions, said center portion having a cross section in the form of an inward-facing L, the upright portion of the L being joined to the outer vertical walls of the inverted U-shaped end portions and the horizontal lip of the L extending inboard of the plane of the outer vertical walls of the end portions; and the lid comprises:
   lateral wing portions overlying the horizontal lip of the L-shaped center portion of each longitudinal beam member, whereby the L-shaped center portions of the longitudinal beam members provide additional support under the sides of the lid without decreasing the width dimension of the access opening to less than the distance between the inner vertical walls of the end portions and without reducing the bending strength of the longitudinal beam members.

3. The poultry cage of claim 2 comprising two identical cage halves of molded plastic, each half including that portion of the cage lying on one side of a vertical plane bisecting the cage.

4. The poultry cage of claim 3 wherein the vertical plane bisecting the cage is perpendicular to the longitudinal beam members, and the cage further comprises:
   circumferential flanges integrally molded on each cage half, each flange having a face abutting the vertical bisecting plane and extending outward from one of the longitudinal beam members across the top, down one side, across the bottom, up the other side and inward to join the other longitudinal beam member for providing additional rigidity and strength to the center portions of the longitudinal beam members and
   fastening means spaced along the flanges for joining the flanges of the two cage halves together.

5. The poultry cage of claim 1 wherein the hinge means comprises:

laterally extending slots in each corner flange at one end of the access opening;

vertical spacer pins mounted on each corner flange at each end of the corresponding lateral slots;

hinge pins attached in spaced relation to the lid in position for resting on top of the spacer pins at each end of each lateral slot when the lid is properly positioned in the access opening; and hinge securing members of resilient material including a portion in the form of a U inverted over each hinge pin when the lid is properly positioned in the access opening, with the vertical arms of the U extending downward through the lateral slot in the corresponding corner flange, and portions extending outward from the ends of the U to engage the under side of the flange adjacent the edges of lateral slot.

6. The poultry cage of claim 1 further including means for latching the lid in the shut position, the latching means comprising:

a latch member mounted in spaced relation to a cutout portion in an edge of the lid opposite the hinged edge, the latch member having a lip for engaging the underside of the beam member adjacent to the latching means when the lid is shut;

torsional hinge tabs joining opposite sides of the latch member to adjacent edges of the cutout portion in the lid along an axis parallel to the beam member adjacent to the latching means for permitting rotation of the latch member about said axis to disengage the lip from the underside of the beam member for opening the lid; and biasing means connected between the lid and the latch member for urging the lip into engagement with the underside of the adjacent beam member when the lid is shut.

7. The poultry cage of claim 6 wherein the lid, the latch member, the torsional hinges and the biasing means comprise an integral structure of molded plastic.

* * * * *